(12) United States Patent
Jones et al.

(10) Patent No.: US 10,592,859 B2
(45) Date of Patent: *Mar. 17, 2020

(54) SHELF SYSTEM AND ASSOCIATED METHODS

(71) Applicant: Walmart Apollo, LLC, Bentonville, AR (US)

(72) Inventors: Nicholaus Adam Jones, Fayetteville, AR (US); Matthew Allen Jones, Bentonville, AR (US); Aaron James Vasgaard, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 232 days.

This patent is subject to a terminal disclaimer.

(21) Appl. No.: 15/683,229

(22) Filed: Aug. 22, 2017

(65) Prior Publication Data

US 2018/0107970 A1 Apr. 19, 2018

Related U.S. Application Data

(60) Provisional application No. 62/407,821, filed on Oct. 13, 2016.

(51) Int. Cl.
  *G06Q 10/08* (2012.01)
  *G01G 19/42* (2006.01)
  (Continued)

(52) U.S. Cl.
  CPC ......... *G06Q 10/087* (2013.01); *A47F 5/0018* (2013.01); *G01G 19/42* (2013.01);
  (Continued)

(58) Field of Classification Search
  None
  See application file for complete search history.

(56) References Cited

U.S. PATENT DOCUMENTS

| | | |
|---|---|---|
| 5,450,968 A | 9/1995 | Bustos |
| 7,584,016 B2 | 9/2009 | Weaver |

(Continued)

FOREIGN PATENT DOCUMENTS

| | | |
|---|---|---|
| EP | 0262374 | 4/1988 |
| EP | 0262374 A1 | 4/1988 |

OTHER PUBLICATIONS

International Search Report and Written Opinion from related International Patent Application No. PCT/US2017/047965 dated Nov. 2, 2017.

(Continued)

*Primary Examiner* — Paul Danneman
(74) *Attorney, Agent, or Firm* — McCarter & English, LLP; David R. Burns

(57) ABSTRACT

An example shelf system and associated methods are described. The shelf system includes a frame with a base member and a vertical member, first and second shelves extending from opposite sides of the vertical member, and first and second pairs of sensors disposed below the base member. In response to positioning a physical object on the first shelf or the second shelf, the physical object applies a torque on the vertical member and each of the sensors output electrical signals corresponding to a change in weight sensed by each of the sensors based on the torque. The shelf system includes a central computing system configured to determine which of the first shelf or the second shelf received the physical object, an estimated location of the physical object on the first or second shelf, and whether the physical object is positioned on the first or second shelf in an expected location.

20 Claims, 8 Drawing Sheets

(51) Int. Cl.
  *A47F 5/00* (2006.01)
  *G01G 19/52* (2006.01)
  *G06F 3/147* (2006.01)
  *G06Q 50/28* (2012.01)
  *G06F 16/29* (2019.01)

(52) U.S. Cl.
  CPC ............ *G01G 19/52* (2013.01); *G06F 3/147* (2013.01); *G06Q 50/28* (2013.01); *G06F 16/29* (2019.01); *G09G 2380/04* (2013.01)

(56) References Cited

U.S. PATENT DOCUMENTS

| | | |
|---|---|---|
| 9,123,018 B2 | 9/2015 | Gentile et al. |
| 9,275,361 B2 | 3/2016 | Meyer |
| 9,984,355 B2 * | 5/2018 | Jones ................... G06Q 10/087 |
| 2002/0060198 A1 | 5/2002 | Bustos |
| 2005/0086133 A1 * | 4/2005 | Scherer ............... G06Q 10/087 705/28 |
| 2006/0071774 A1 * | 4/2006 | Brown ................. G06Q 10/087 340/522 |
| 2007/0050271 A1 | 3/2007 | Ufford et al. |
| 2009/0058644 A1 | 3/2009 | French et al. |
| 2013/0117053 A2 | 5/2013 | Campbell |
| 2014/0201041 A1 | 7/2014 | Meyer |
| 2015/0257546 A1 | 9/2015 | Pichel |

OTHER PUBLICATIONS

Moorthy, Rahul, et al., On-Shelf Availability in Retailing, International Journal of Computer Applications, vol. 116—No. 23, Apr. 2015.

* cited by examiner

SHELF SYSTEM AND ASSOCIATED METHODS

CROSS-REFERENCE TO RELATED APPLICATIONS

This application claims the benefit of commonly assigned U.S. Provisional Patent Application No. 62/407,821, which was filed on Oct. 13, 2016. The entire content of the foregoing provisional patent application is incorporated herein by reference.

BACKGROUND

Maintaining shelves stocked with a desired number of objects and ensuring that the proper objects are placed on the proper shelves in the proper location can be a time-consuming, error-prone process.

SUMMARY

Exemplary embodiments of the present disclosure provide a shelf system that identifies which shelf received a physical object, an estimated location of the physical object on the shelf, and whether the physical object is positioned in an expected or proper location on the shelf. In particular, a non-limiting embodiment of the shelf system includes two pairs of sensors disposed below a base member of the shelf system. In response to positioning the physical object on one of the shelves, the physical object applies a torque on the shelf system and each of the sensors output electrical signals corresponding to a change in weight based on the torque. The shelf system is capable of estimating the location of physical objects in the shelf system based on the output electrical signals from the sensors, and determines if the physical objects have been placed on the proper shelf and in the proper location. Further, the shelf system can issue an alert indicating a need for additional physical objects and/or movement physical objects to other locations in the shelf system.

In accordance with embodiments of the present disclosure, an exemplary shelf system is provided. The shelf system includes a frame that includes a base member and a vertical member mounted to the base member. The vertical member includes a first vertically oriented side and a second vertically oriented side each configured and dimensioned to support one or more shelves. The base member and the vertical member define a substantially inverted T-shaped configuration. The shelf system includes a first shelf extending from the first vertically oriented side of the frame and a second shelf extending from the second vertically oriented side of the frame. The first and second shelves each include a supporting surface, a proximal end disposed adjacent to the respective first and second vertically oriented sides, and a distal end spaced from the respective first and second vertically oriented sides. A depth of the first and second shelves is defined by a distance between the proximal end and the distal end.

The shelf system includes a first pair of sensors disposed below the base member in a spaced manner on one side of the vertical member of the frame and a second pair of sensors disposed below the base member in a spaced manner on an opposing side of the vertical member of the frame. In response to positioning a physical object on the supporting surface of the first shelf or the second shelf, the physical object applies a torque on the vertical member and each of the sensors in the first and second pair of sensors output electrical signals corresponding to a change in weight sensed by each of the sensors based on the torque. The shelf system includes an interface operatively coupled to the first and second pair of sensors and configured to transmit the change in weight sensed by each of the sensors to a central computing system. The shelf system includes the central computing system configured to receive as input the change in weight sensed by each of the sensors and determine in a three-dimensional coordinate system which of the first shelf or the second shelf received the physical object, an estimated location of the physical object on the first or second shelf, and whether the physical object is positioned on the first or second shelf in an expected location based on the change in weight sensed by each of the sensors.

The shelf system includes a correlation engine that receives as input the change in weight sensed by each of the sensors, and determines a need for additional physical objects (e.g., restocking) on the first shelf or the second shelf. The shelf system includes a transmission engine that receives as input the need for the additional physical objects on the first shelf or the second shelf, and electronically transmits an alert to a handheld device (e.g., a handheld device of a retail associate) regarding the need for the additional physical objects. The alert transmitted by the transmission engine can indicate whether the additional physical objects are needed on the first shelf or the second shelf. In some embodiments, the alert to the handheld device can include information regarding a storage location of the physical object within a storage area of a geographic area and a display location within a display area of the geographic area.

The frame can include one or more additional shelves (e.g., a third shelf extending from the first vertically oriented side of the frame and disposed below the first shelf, and a fourth shelf extending from the second vertically oriented side of the frame and disposed below the second shelf). The base member extends substantially parallel to horizontal and includes a first front edge and a second front edge. The first pair of sensors is disposed below the base member and is located at or near the first front edge. The second pair of sensors is disposed below the base member and is located at or near the second front edge. In some embodiments, each of the sensors can be a force sensor. In some embodiments, each of the sensors can be a pressure sensor.

In accordance with embodiments of the present disclosure, an exemplary non-transitory computer-readable medium storing instructions for operating a shelf system is provided. The instructions are executable by a processing device. The shelf system includes a frame including a base member and a vertical member mounted to the base member. The vertical member includes a first vertically oriented side and a second vertically oriented side each configured and dimensioned to support one or more shelves. The base member and the vertical member define a substantially inverted T-shaped configuration. The shelf system includes a first shelf extending from the first vertically oriented side of the frame and a second shelf extending from the second vertically oriented side of the frame. The first and second shelves each include a supporting surface, a proximal end disposed adjacent to the respective first and second vertically oriented sides, and a distal end spaced from the respective first and second vertically oriented sides. A depth of the first and second shelves is defined by a distance between the proximal end and the distal end. The shelf system includes a first pair of sensors disposed below the base member in a spaced manner on one side of the vertical member of the frame and a second pair of sensors disposed below the base member in a spaced manner on an opposing side of the vertical member of the frame. In response to positioning a physical object on the supporting surface of the first shelf or the second shelf, the physical object applies a torque on the vertical member and each of the sensors in the first and second pair of sensors output electrical signals corresponding to a change in weight sensed by each of the sensors based on the torque.

Execution of the instructions by the processing device causes the processing device to transmit the change in weight sensed by each of the sensors from an interface operatively coupled to the first and second pair of sensors to a central computing system. Execution of the instructions by the processing device causes the processing device to determine in a three-dimensional coordinate system at the central computing system which of the first shelf or the second shelf received the physical object, an estimated location of the physical object on the first or second shelf, and whether the physical object is positioned on the first or second shelf in an expected location based on the change in weight sensed by each of the sensors.

Execution of the instructions by the processing device causes the processing device to electronically transmit the change in weight sensed by each of the sensors to a correlation engine and determine, via the correlation engine, a need for additional physical objects on the first shelf or the second shelf. Execution of the instructions by the processing device causes the processing device to electronically transmit the need for the additional physical objects on the first shelf or the second shelf to a transmission engine and electronically transmit, via the transmission engine, an alert to a handheld device regarding the need for the additional physical objects. The alert transmitted by the transmission engine can indicate whether the additional physical objects are needed on the first shelf or the second shelf.

In accordance with embodiments of the present disclosure, an exemplary method of operating a shelf system is provided. The method includes placing a physical object on a supporting surface of a first shelf or a second shelf of a shelf system. The shelf system includes a frame including a base member and a vertical member mounted to the base member. The vertical member includes a first vertically oriented side and a second vertically oriented side each configured and dimensioned to support one or more shelves, wherein the base member and the vertical member define a substantially inverted T-shaped configuration. The first shelf extends from the first vertically oriented side of the frame and the second shelf extends from the second vertically oriented side of the frame. The first and second shelves each include the supporting surface, a proximal end disposed adjacent to the respective first and second vertically oriented sides, and a distal end spaced from the respective first and second vertically oriented sides. A depth of the first and second shelves is defined by a distance between the proximal end and the distal end. The shelf system includes a first pair of sensors disposed below the base member in a spaced manner on one side of the vertical member of the frame and a second pair of sensors disposed below the base member in a spaced manner on an opposing side of the vertical member of the frame. The shelf system includes an interface operatively coupled to the first and second pair of sensors, and a central computing system.

In response to positioning the physical object on the supporting surface of the first shelf or the second shelf and the physical object applying a torque on the vertical member, the method includes outputting electrical signals with each of the first and second pair of sensors corresponding to a change in weight sensed by each of the sensors based on the torque. The method includes transmitting, via the interface, the change in weight sensed by each of the sensors to the central computing system. The method further includes determining in a three-dimensional coordinate system at the central computing system which of the first shelf or the second shelf received the physical object, an estimated location of the physical object on the first or second shelf, and whether the physical object is positioned on the first or second shelf in an expected location based on the change in weight sensed by each of the sensors.

The method includes receiving as input to a correlation engine the change in weight sensed by each of the sensors, and determining a need for additional physical objects on the first shelf or the second shelf. The method includes receiving as input to a transmission engine the need for the additional physical objects on the first shelf or the second shelf, and electronically transmitting an alert to a handheld device regarding the need for the additional physical objects. The alert transmitted by the transmission engine can indicate whether the additional physical objects are needed on the first shelf or the second shelf. The alert to the handheld device can include information regarding a storage location of the physical object within a storage area of a geographic area and a display location within a display area of the geographic area.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed shelf system and associated methods, reference is made to the accompanying figures, wherein.

DETAILED DESCRIPTION

Exemplary embodiments of the present disclosure provide a shelf system that identifies which shelf received a physical object, an estimated location of the physical object on the shelf, and whether the physical object is positioned in an expected or proper location on the shelf. In particular, the shelf system includes two pairs of sensors disposed below a base member of the shelf system. In response to positioning the physical object on one of the shelves, the physical object applies a torque on the shelf system and each of the sensors output electrical signals corresponding to a change in weight based on the torque. The shelf system is capable of estimating the location of the physical object in the shelf system based on the output electrical signals from the sensors, and determines if the physical object has been placed on the proper shelf and in the proper location. Further, the shelf system can issue an alert indicating a need for restocking of physical objects and/or movement of physical objects to other locations in the shelf system.

Figure 1:
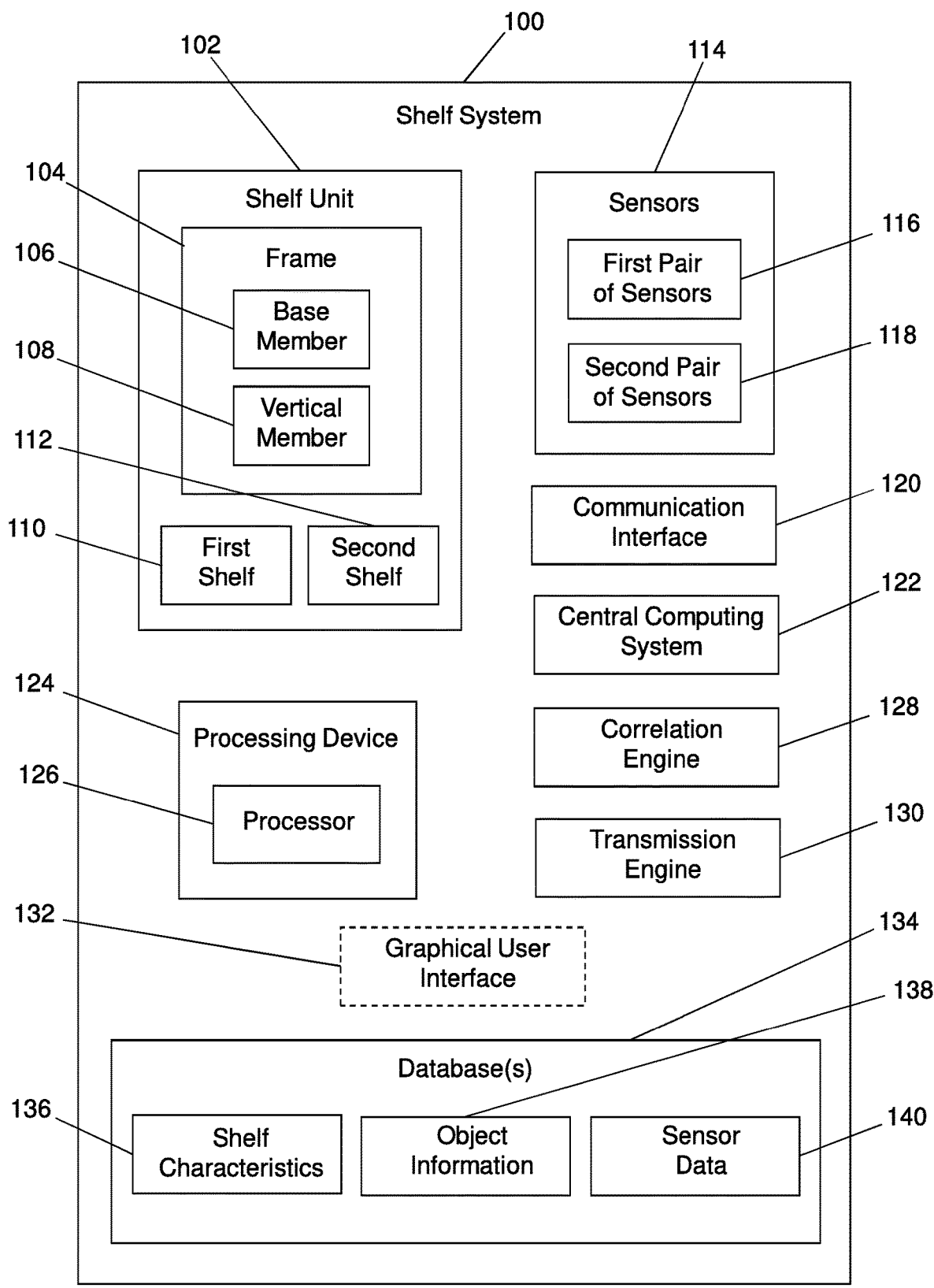
FIG. 1 is a block diagram of an exemplary shelf system of the present disclosure.

FIG. 1 is a block diagram of an exemplary shelf system 100 (hereinafter "system 100") of the present disclosure. The system 100 generally includes one or more shelf units 102, each shelf unit 102 including frame 104 with a base member 106 and a vertical member 108 mounted to the base member 106. The vertical member 108 of the frame 104 includes first and second vertically oriented sides each configured to support one or more shelves (e.g., a first shelf 110 and a second shelf 112) on opposing sides of the vertical member 108. The system 100 includes sensors 114 disposed below or integrated within the base member 106 and configured to detect changes in weight of the shelf unit 102 due to placement of one or more physical objects on the first and/or second shelf 110, 112.

For example, a first pair of sensors 116 can be disposed below or integrated within the base member 106 on one side of the vertical member 108, and a second pair of sensors 118 can be disposed below or integrated within the base member 106 on an opposing side of the vertical member 108. As a further example, the first pair of sensors 116 can be disposed at or near the corners of one side of the base member 106, and the second pair of sensors 118 can be disposed at or near the corners of the opposing side of the base member 106. In some embodiments, more than two sensors 114 can be used on either side of the base member 106. Thus, weight differential of the shelf unit 102 as one or more physical objects are placed on the first and/or second shelves 110, 112 can be detected based on the torque applied to the shelf unit 102 by objects resting on the first and/or second shelves 110, 112. For example, as the physical object is placed on the first shelf 110, the physical object applies a torque on the vertical member 108 and each of the sensors 114 outputs electrical signals corresponding to a change in weight sensed by the sensors 114 based on the torque. In particular, the torque on the vertical member 108 results in a change in weight distribution of the shelf unit 102 which is detected at each sensor 114.

The system 100 generally includes a communication interface 120 and a central computing system 122. The communication interface 120 is operatively coupled to the sensors 114 and is configured to electronically transmit data from the sensors 114 (e.g., the detected change in weight) to the central computing system 122. In some embodiments, the system 100 includes a processing device 124 including a processor 126. In some embodiments, the processing device 124 can be part of the central computing system 122. In some embodiments, the central computing system 122 can be operatively coupled to the processing device 124 such that data received at the central computing system 122 can be transmitted to/from the processing device 124.

The system 100 can include a correlation engine 128 configured to receive as input data from the sensors 114 (e.g., the change in weight of the shelf unit 102), and determines a need for additional physical objects on the first and/or second shelf 110, 112. In some embodiments, one or more portions of the correlation engine 128 can be executed by the central computing system 122. In particular, based on the detected change in weight in a three-dimensional coordinate system, the correlation engine 128 can determine whether additional physical objects should be added to one or more shelves of the shelf unit 102. As an example, if physical objects on the first shelf 110 are being removed, the torque imparted on the vertical member 108 on the side of the first shelf 110 is reduced with removal of each physical object from the first shelf 110. The reduction in torque on the vertical member 108 on the side of the first shelf 110 results in a greater weight imparted on the sensors 114 on the side of the second unit 102 (e.g., on the opposing side of the vertical member 108). The different weights sensed by the sensors 114 can be used to approximate x, y, and z components to estimate a location on the shelving unit 102 where an object was placed or removed. The system 100 can establish an origin in the three-dimensional coordinate system when the shelving unit 102 is empty (i.e., when no objects are being supported by the shelving unit 102), and can determine the x, y, and z values relative to the origin.

Based on the detected change in weight distribution of the shelf unit 102 within a three-dimensional coordinate system, the correlation engine 128 can determine that the physical objects on the first shelf 110 need to be restocked. The system 100 can include a transmission engine 130 configured to receive as input the need for the additional physical objects, and electronically transmits an electronic alert to a graphical user interface (GUI) 132 of a handheld device regarding the need for restocking the physical objects. In some embodiments, one or more portions of the transmission engine 130 can be executed by the central computing system 122. The alert can indicate whether additional physical objects are needed on a particular shelf of the shelf unit 102 (e.g., based on the change in weight distribution detected within a three-dimensional coordinate system), and can further include information regarding the storage location of the physical object within a storage area of a geographic area and/or a display location (e.g., a specific shelf unit 102 or bin number) of the physical object within a display area of the geographic area.

Figure 2:
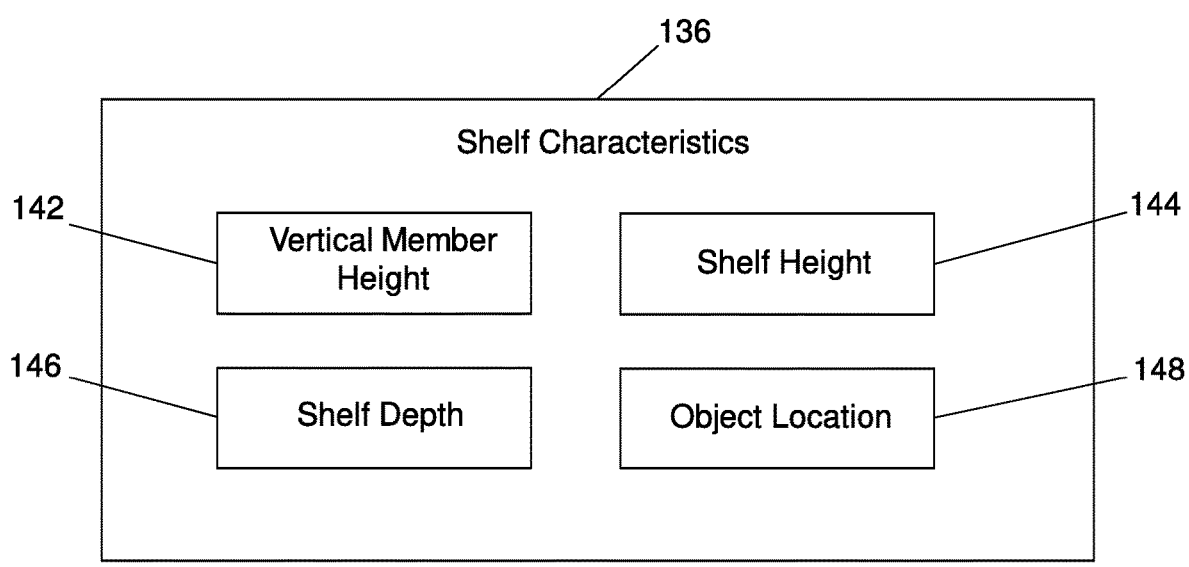
FIG. 2 is a block diagram of an exemplary shelf characteristics database of the present disclosure.

The system 100 includes one or more databases 134 configured to electronically store data. For example, the system 100 can include data corresponding to shelf characteristics 136, object information 138, and sensor data 140. As shown in FIG. 2, the shelf characteristics 136 can include the vertical member height 142, the shelf height 144, the shelf depth 146, and the object location 148. The vertical member height 142 corresponds to the height of the vertical member 108 of the shelf unit 102.

The shelf height 144 corresponds to the height of each shelf (e.g., the first shelf 110, the second shelf 112, or the like) relative to the base member 106 along the height of the vertical member 108. The location of the shelf along the height of the vertical member 108 affects the amount of torque imparted on the vertical member 108 when physical objects are placed on the shelf. For example, a heavy object placed on a shelf located near the bottom of the vertical member 108 (e.g., near the base member 106) imparts less torque on the vertical member 108 than the same object placed on a higher shelf. As a further example, a heavy object placed on a shelf located near the bottom of the vertical member 108 can impart a substantially similar torque on the vertical member 108 as a light object placed on a higher shelf.

The shelf depth 146 corresponds to the length of the shelf as measured between a proximal and distal end of the shelf (e.g., the proximal end being disposed adjacent to the vertical member 108 and the distal end being disposed furthest from the vertical member 108). The location of the physical object along the depth of the shelf affects the amount of torque imparted on the vertical member 108 when objects are placed on the shelf. For example, a heavy object placed near the distal end of the shelf imparts more torque on the vertical member 108 than a heavy object placed near the proximal end of the shelf. As a further example, a heavy object placed near the proximal end of the shelf can impart a substantially similar torque on the vertical member 108 as a light object placed near the distal end of the shelf.

The object location 148 corresponds to the expected or proper location of a particular object on the shelf unit 102 (e.g., within a three-dimensional coordinate system). In particular, the object location 148 can indicate the proper shelf unit 102 within the geographic area on which the object should be displayed or stored, and the specific shelf of the shelf unit 102 on which the object should be placed. The object location 148 can further indicate the location of the object along the length of the shelf if two or more objects are positioned on the same shelf (e.g., three-dimensional coordinates associated with the specific location of the object).

Still with reference to FIG. 1, the object information 138 can include the name of the object, a weight of the object, weight characteristics/distribution of the object (e.g., symmetrically weighted versus biased weight), the size of the object, the expected quantity of the object to be placed on the shelf, a storage area of the object, or the like. The size and/or weight characteristics of the object can assist in determining the position of the object from left to right on the shelf as viewed from the front or distal end 226 of the shelf. The sensor data 140 includes data obtained from each of the sensors 114 corresponding to the weight distribution and fluctuation of the shelf unit 102 as one or more physical objects are placed on the shelves of the shelf unit 102. For example, the sensor data 140 can include the "unloaded" weight distribution of the shelf unit 102 prior to placement of physical objects on the shelves of the shelf unit 102, and the "loaded" weight distribution of the shelf unit 102 when a set of physical objects have been placed on the proper shelves of the shelf unit 102.

Figure 3:
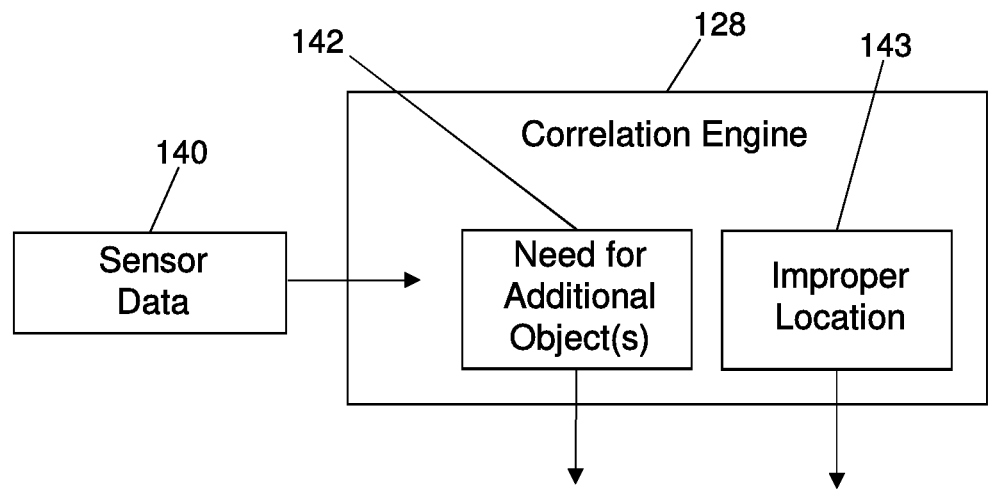
FIG. 3 is a block diagram of an exemplary correlation engine of the present disclosure.

FIG. 3 is a block diagram of the correlation engine 128 of FIG. 1. The correlation engine 128 is configured to receive as input the sensor data 140, and outputs a need for additional objects 142. In particular, based on the detected weight fluctuations of the shelf unit 102 in the form of the sensor data 140, the correlation engine 128 determines whether one or more additional objects should be restocked on the appropriate shelves.

In some embodiments, based on the detected weight fluctuations of the shelf unit 102, the correlation engine 128 determines whether the one or more objects placed on a particular shelf are in the improper location 143. For example, based on the object information 138, the correlation engine 128 can determine the estimated weight fluctuation expected to be detected by the sensors 114 when a particular object is placed on a particular shelf where the object belongs (e.g., a range of expected weight fluctuation). If the detected weight fluctuation exceeds a predetermined value or range of expected weight fluctuation when an object is placed on the shelf, the correlation engine 128 can output the improper location 143.

Figure 4:
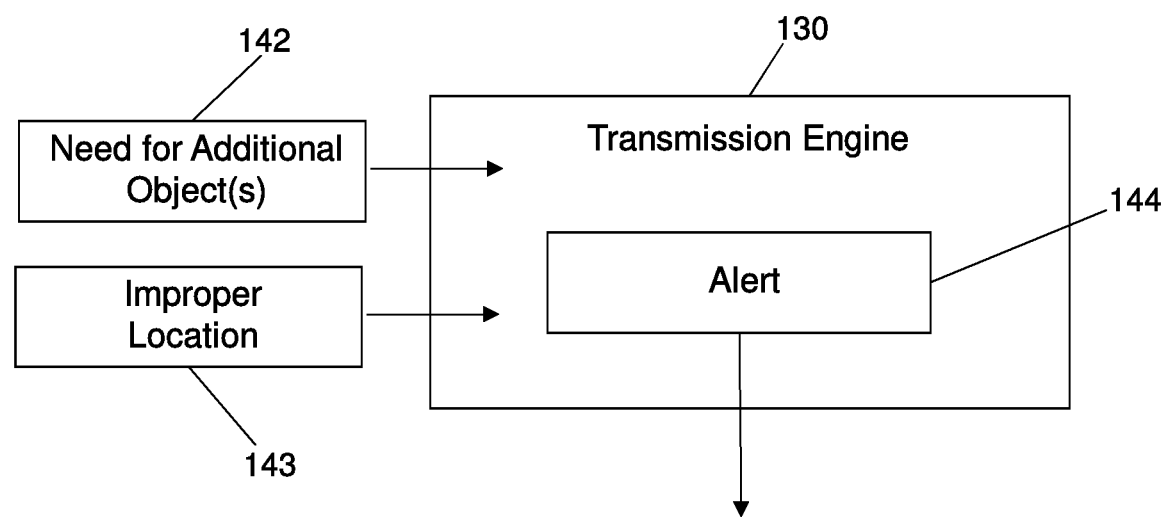
FIG. 4 is a block diagram of an exemplary transmission engine of the present disclosure.

FIG. 4 is a block diagram of the transmission engine 130 of FIG. 1. The transmission engine 130 is configured to receive as input the need for additional objects 142 as output from the correlation engine 128, and outputs an electronic alert 144 to a GUI 132. For example, if the correlation engine 128 determines that one or more objects need to be restocked on the appropriate shelves, the transmission engine 130 can output an electronic alert 144 indicating the object to be restocked, the specific shelf unit 102 on which the object should be restocked, and the particular shelf and/or bin of the shelf unit 102 on which the object should be placed.

In some embodiments, the transmission engine 130 can be configured to receive as input the improper location 143 as output from the correlation engine 128, and outputs the electronic alert 144 to the GUI 132. For example, if the correlation engine 128 determines that the improper weight fluctuation was detected, the transmission engine 130 can output the electronic alert 144 indicating the variation in weight fluctuation and the potential for an improper object being placed on the shelf. The electronic alert 144 can be used by an associate to either confirm that the proper object is placed on the shelf or reposition the object in the proper location.

Figure 5:
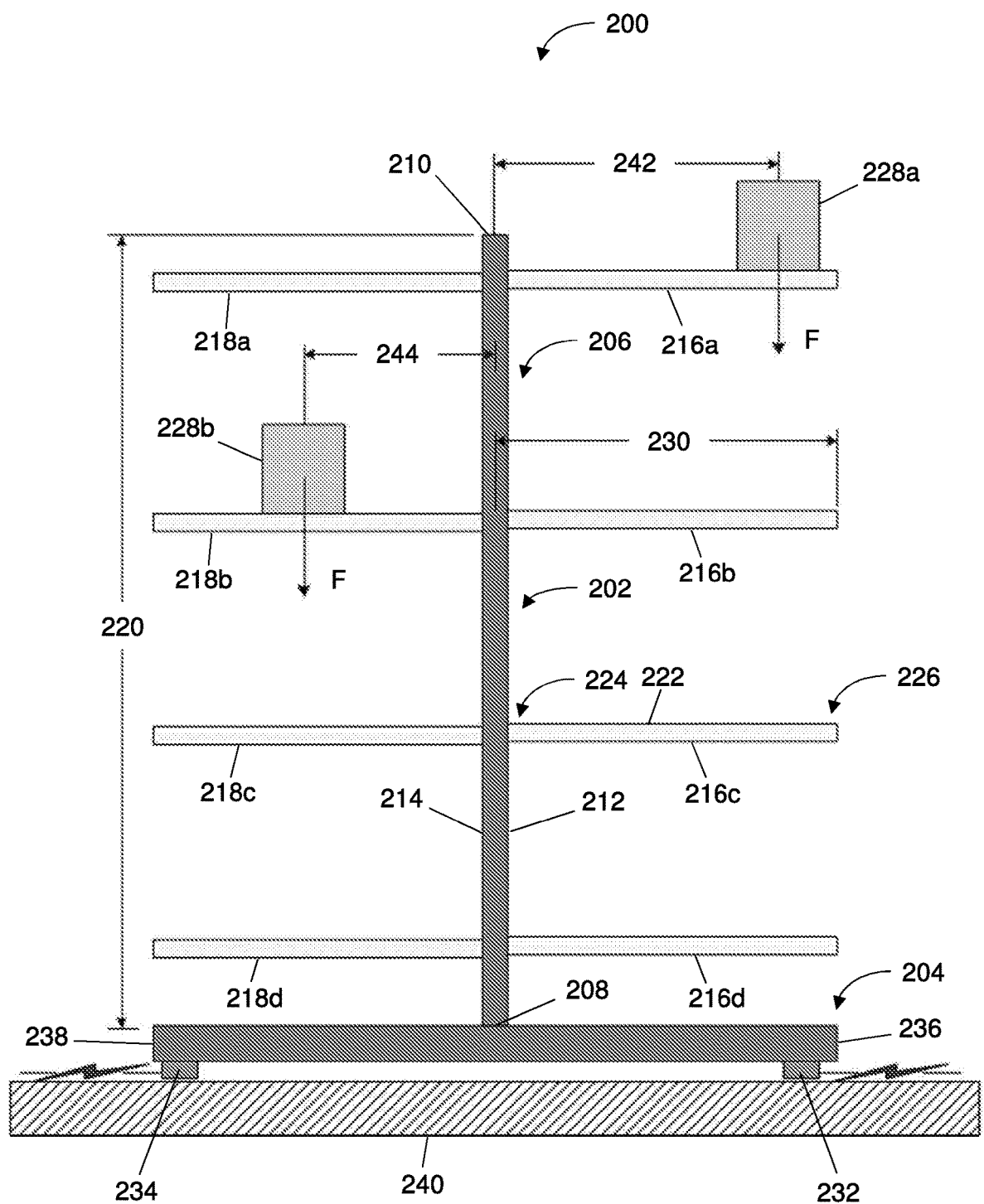
FIG. 5 is a diagrammatic side view of an exemplary shelf unit of a shelf system of the present disclosure.

FIG. 5 is a diagrammatic side view of an exemplary shelf unit 200 in accordance with embodiments of the present disclosure. The shelf unit 200 includes a frame 202 including a base member 204 and a vertical member 206 mounted to the base member 204. In some embodiments, the vertical member 206 is mounted at a central point of the base member 204 and defines a substantially inverted T-shaped configuration (e.g., a T-bar). The vertical member 206 includes a bottom end 208 that is mounted to the vertical member 206, and a top end 210 that defines the top of the shelf unit 200. The vertical member 206 further includes a first vertically oriented side 212 and a second vertically oriented side 214 on opposing sides of the vertical member 206.

The shelf unit 200 includes one or more shelves 216a-d mounted to and extending from the first vertically oriented side 212, and one or more shelves 218a-d mounted to and extending from the second vertically oriented side 214. Although shown as extending from the same location along the vertical member height 220, it should be understood that the shelves 216a-d and the shelves 218a-d can be located at different locations along the height 220. Each shelf includes a supporting surface 222 defining the top surface of the shelf and extending between a proximal end 224 and a distal end 226 of the shelf. The supporting surface 222 can be configured and dimensioned to receive one or more objects 228a, 228b thereon. A depth of each shelf can be defines by the distance 230 between the proximal and distal ends 224, 226.

The shelf unit 200 includes a first pair of sensors 232 and a second pair of sensors 234 disposed below or integrated within the base member 204. Each sensor 232, 234 can be, e.g., a force sensor, a pressure sensor, a weight sensor, combinations thereof, or the like. Although illustrated as a single sensor, it should be understood that when viewed from above, the base member 204 includes a sensor disposed below or integrated within each corner of the base member 204. In particular, each sensor the pairs of sensors 232, 234 is spaced from the other sensors. In some embodiments, more than two pairs of sensors 232, 234 can be disposed below or integrated within the base member 204.

The base member 204 generally includes first and second front edges 236, 238. The first pair of sensors 232 can be located at or near the first front edge 236, and the second pair of sensors 234 can be located at or near the second front edge 238. The sensors 232, 234 can be positioned on a surface 240 (e.g., a floor) such that the base member 204 extends substantially parallel to horizontal. Based on a change in weight distribution due to torque imparted on the vertical member 202 from the objects 228a, 228b, each of the sensors 232, 234 transmits electrical signals corresponding to the detected change in weight. In particular, in embodiments of the present disclosure, rather than measuring the torque imparted on the vertical member 202 by each shelf individually, the sensors 232, 234 determine the weight distribution of the shelf unit 200 as a whole based on the cumulative torque imparted on the vertical member 202 by all of the shelves secured to the vertical member 202. Each of the sensors 232, 234 can be communicatively connected to the database 134 or the correlation engine 128 via the communication interface 120.

As noted above, depending on the position and type of object 228a, 228b placed on the shelves 216a-d, 218a-d, the torque imparted on the vertical member 202 changes, thereby varying the weight distribution detected by the sensors 232, 234. For example, positioning the object 228a (e.g., a heavy object) at or near the distal end 226 of the shelf 216a at a distance 242 from the vertical member 202 imparts a greater torque on the vertical member 202 than positioning the same object 228a at a distance 244 (e.g., closer to the vertical member 202). As a further example, positioning the object 228a at or near the distal end 226 of the shelf 216a at the distance 242 from the vertical member 202 imparts a greater torque on the vertical member 202 than positioning the same object 228a at the distance 242 on a lower shelf, such as shelf 216b. Positioning the same object 228a at the distance 242 on the shelf 216c imparts a lower torque on the vertical member 202 than positioning the object 228a on the shelf 216b and, similarly, positioning the object 228a at the distance 242 on the shelf 216 imparts a lower torque than positioning the object 228a on the shelf 216c. Higher torque on the vertical member 202 corresponds to a higher weight differential sensed by the sensors 232, 234, while a lower torque on the vertical member 202 corresponds to a lower weight differential sensed by the sensors 232, 234.

Further, the weight of the object 228a, 228b (depicted as force F) affects the amount of torque imparted on the vertical member 202. For example, a heavy object 228a positioned at the distance 242 on the shelf 216a imparts a greater torque on the vertical member 202 than a lighter object 228b positioned in the same place. As a further example, a heavy object 228a positioned at the distance 242 on the shelf 216d may impart a lower torque on the vertical member 202 than a lighter object 228b positioned at the distance 242 on the shelf 216a. As a further example, a heavy object 228a positioned near the vertical member 202 on the shelf 216a may impart a lower torque on the vertical member 202 than a lighter object 228b positioned at the distance 242 on the shelf 216a.

While having an object 228a placed on the shelf 216a at the distance 242 imparts a torque on the vertical member 202 resulting in a weight differential detected by the sensors 232, 234, simultaneously placing an object 228a on the shelves 216a, 218a on opposite sides of the vertical member 202 results in equal and opposite torque on the vertical member 202 and substantially no weight differential detected by the sensors 232, 234. However, placing the object 228a first on the shelf 216a prior to placing the object 228a on the shelf 218a allows the system 100 to initially detect the weight differential of the first object 228a being restocked on the shelf 216a, and further detects the weight differential when the object 228 is being restocked on the shelf 218a.

As noted above, the system 100 includes data corresponding to the known object weight and the expected position of each object on the shelf unit 200. In particular, the system 100 includes data indicating the specific shelf on which each object is to be placed. Based on the object weight and the specific shelf for the object (e.g., the height of the shelf relative to the vertical member 202), the system 100 correlates the expected torque imparted on the vertical member 202 when the object is positioned on the assigned shelf, and the estimated weight differential to be detected by the sensors 232, 234 when the objects have been fully stocked on the assigned shelf. Thus, when restocking of the shelves occurs, the system 100 determines which of the shelves received the object based on the weight differential detected by the sensors 232, 234. Further, based on the amount of torque generated by the object due to the object weight and shelf height, the system 100 determines the estimated location of the object on the shelf.

Further, the system 100 determines whether the object positioned on the shelf is in the expected or proper location based on the weight differential detected by the sensors 232, 234 (e.g., whether the object should actually be on the shelf where it has been positioned). For example, if a heavy object 228a (e.g., a 36 oz. object) is expected on the shelf 216a, the system 100 estimates the weight differential to be detected by the sensors 232, 234 when the heavy object 228a is placed on the shelf 216a. If, however, a lighter object 228b (e.g., a 12 oz. object) is inadvertently positioned on the shelf 216a instead, the resulting weight differential is smaller than the estimated weight differential. The system 100 can therefore transmit an alert to a handheld device of a user indicating that an improper object has been placed on the shelf 216a. The system 100 can also detect when object are being removed from the shelves and need to be restocked. In particular, the sensors 232, 234 detect the reduction in weight differential caused by a reduction in torque when objects are removed from the shelves. When such reduction is detected by the sensors 232, 234, the system 100 can issue an alert to a handheld device of a user indicating that restocking of at least one item on the shelf is needed. In some embodiments, the system 100 can issue the alert when the weight differential exceeds a predetermined amount.

Figure 6:
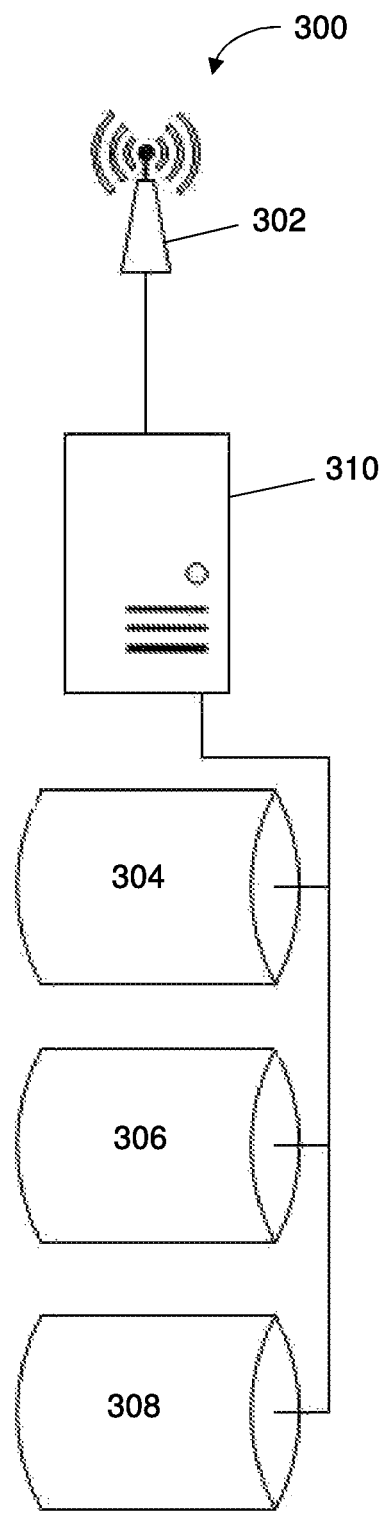
FIG. 6 is a block diagram of an exemplary database system of a shelf system of the present disclosure.

FIG. 6 is a block diagram of an exemplary database system 300 of the system 100 in accordance with embodiments of the present disclosure. The database system 300 generally includes a wireless access point 302 in communication with each of the sensors of the system 100. The wireless access point 302 can be configured to electronically receive data from each of the sensors and transmit the data to databases 304, 306, 308 via a server 310. In some embodiments, database 304 can include data corresponding to the weight or force differential detected by the sensors. In some embodiments, the database 306 can include data corresponding to the inventory of objects (such as the object name, brand name, estimated weight, or the like) positioned and/or to be positioned on the shelves. In some embodiments, the database 308 can include data corresponding to the associates or users responsible for restocking the objects on the shelves. The system 100 can thereby correlate the object inventory data with the weight differential data and, if the weight differential reaches a predetermined amount, issues an alert to an associate or user requesting that a specific object be restocked on the shelves.

Figure 7:
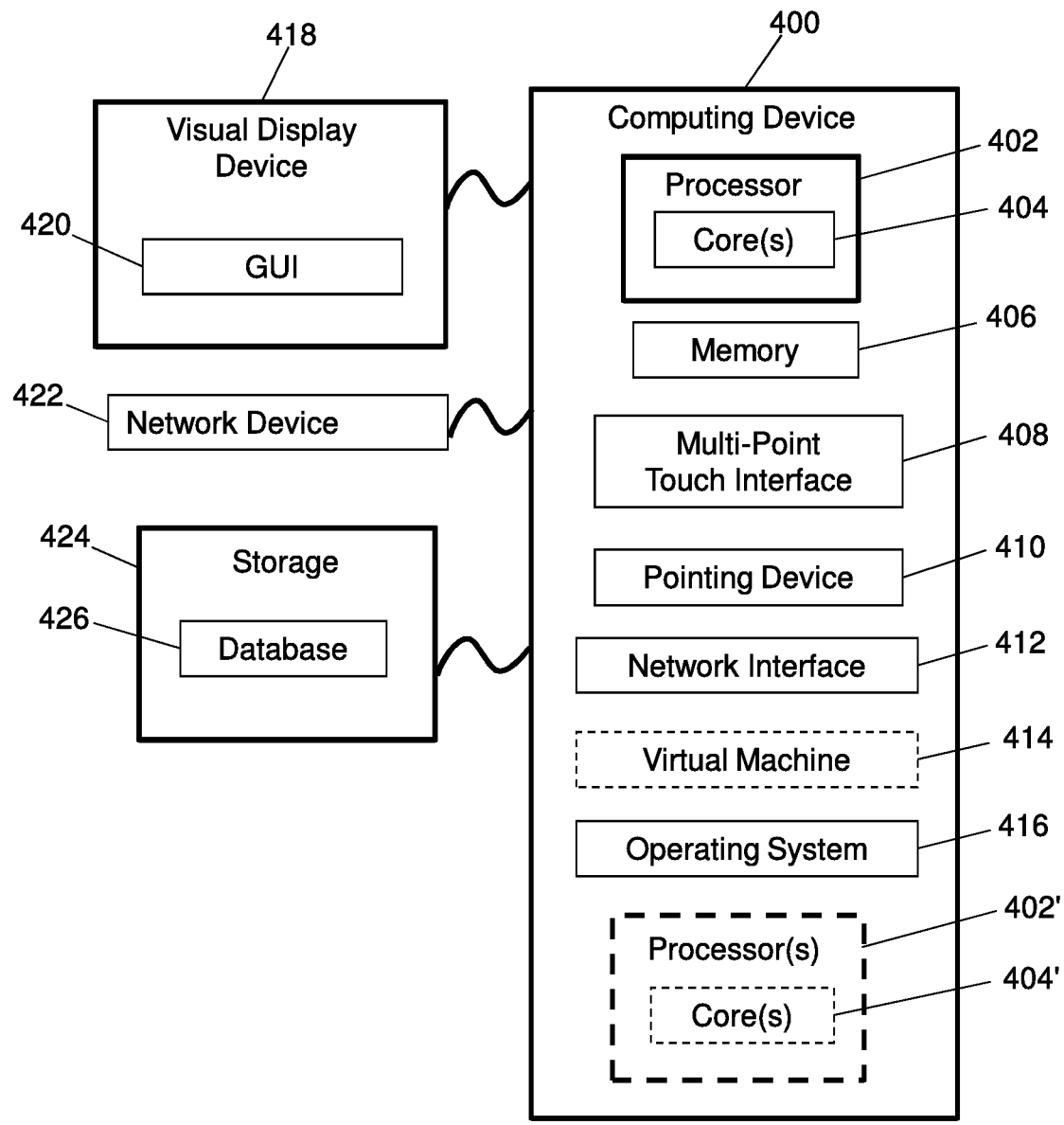
FIG. 7 is a block diagram of a computing device in accordance with exemplary embodiments of the present disclosure.

FIG. 7 is a block diagram of a computing device 400 in accordance with exemplary embodiments of the present disclosure. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions or software for implementing exemplary embodiments of the present disclosure (e.g., instructions for actuating or controlling the sensors 114, executing the communication interface 120, executing the central computing system 122, executing the correlation engine 128, executing the transmission engine 130, combinations thereof, or the like). The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' may each be a single core processor or multiple core (404 and 404') processor.

Virtualization may be employed in the computing device 400 so that infrastructure and resources in the computing device 400 may be shared dynamically. A virtual machine 414 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

A user may interact with the computing device 400 through a visual display device 418 (e.g., a personal computer, a mobile smart device, or the like), such as a computer monitor, which may display one or more user interfaces 420 (e.g., GUI 132) that may be provided in accordance with exemplary embodiments. The computing device 400 may include other I/O devices for receiving input from a user, for example, a keyboard or any suitable multi-point touch interface 408, a pointing device 410 (e.g., a mouse). The keyboard 408 and the pointing device 410 may be coupled to the visual display device 418. The computing device 400 may include other suitable conventional I/O peripherals.

The computing device 400 may also include one or more storage devices 424, such as a hard-drive, CD-ROM, or other computer readable media, for storing data and computer-readable instructions and/or software that implement exemplary embodiments of the system 100 described herein. Exemplary storage device 424 may also store one or more databases 426 for storing any suitable information required to implement exemplary embodiments. For example, exemplary storage device 424 can store one or more databases 426 for storing information, such as data relating to shelf characteristics 136, object information 138, sensor data 140, combinations thereof, or the like, and computer-readable instructions and/or software that implement exemplary embodiments described herein. The databases 426 may be updated by manually or automatically at any suitable time to add, delete, and/or update one or more items in the databases.

The computing device 400 can include a network interface 412 configured to interface via one or more network devices 422 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 may include a built-in network adapter, network interface card, PCMCIA network card, card bus network adapter, wireless network adapter, USB network adapter, modem or any other device suitable for interfacing the computing device 400 to any type of network capable of communication and performing the operations described herein. Moreover, the computing device 400 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 400 may run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 416 may be run in native mode or emulated mode. In an exemplary embodiment, the operating system 416 may be run on one or more cloud machine instances.

Figure 8:
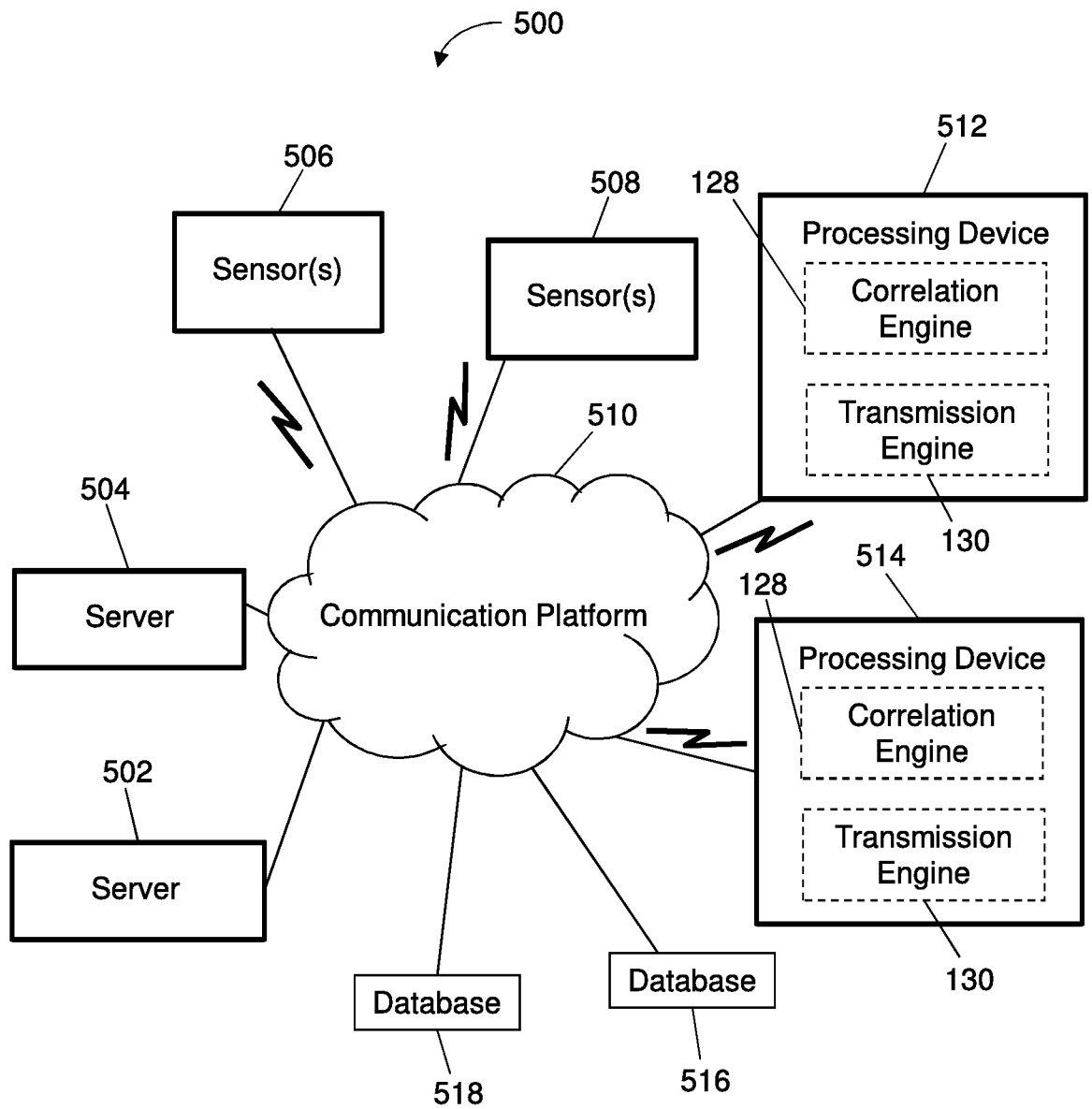
FIG. 8 is a block diagram of an exemplary shelf system environment in accordance with embodiments of the present disclosure.

FIG. 8 is a block diagram of an exemplary shelf system environment 500 in accordance with exemplary embodiments of the present disclosure. The environment 500 can include servers 502, 504 configured to be in communication with sensors 506, 508 (including sensors 114), via a communication platform 510, which can be any network over which information can be transmitted between devices communicatively coupled to the network. For example, the communication platform 510 can be the Internet, Intranet, virtual private network (VPN), wide area network (WAN), local area network (LAN), and the like. In some embodiments, the communication platform 510 can be part of a cloud environment. The environment 500 can include processing devices 512, 514 (e.g., processing devices 124 including one or more portions of the central computing system 122, the correlation engine 128 and/or the transmission engine 130), which can be in communication with the servers 502, 504, as well as the sensors 506, 508, via the communication platform 510. The environment 500 can include repositories or databases 516, 518, which can be in communication with the servers 502, 504, as well as the sensors 506, 508 and the processing devices 512, 514, via the communications platform 260.

In exemplary embodiments, the servers 502, 504, sensors 506, 508, processing devices 512, 514, and databases 516, 518 can be implemented as computing devices (e.g., computing device 400). Those skilled in the art will recognize that the databases 516, 518 can be incorporated into one or more of the servers 502, 504 such that one or more of the servers 502, 504 can include databases 516, 518. In some embodiments, the database 516 can store the shelf characteristics 136 and the object information 138, and the database 518 can store the sensor data 140. In some embodiments, a single database 516, 518 can store the shelf characteristics 136, the object information 138, and the sensor data 140. In some embodiments, embodiments of the servers 252, 254 can be configured to implement one or more portions of the system 100. In some embodiments, the processing devices 512, 514 can include one or more portions of the correlation engine 128 and/or the transmission engine 130.

Figure 9:
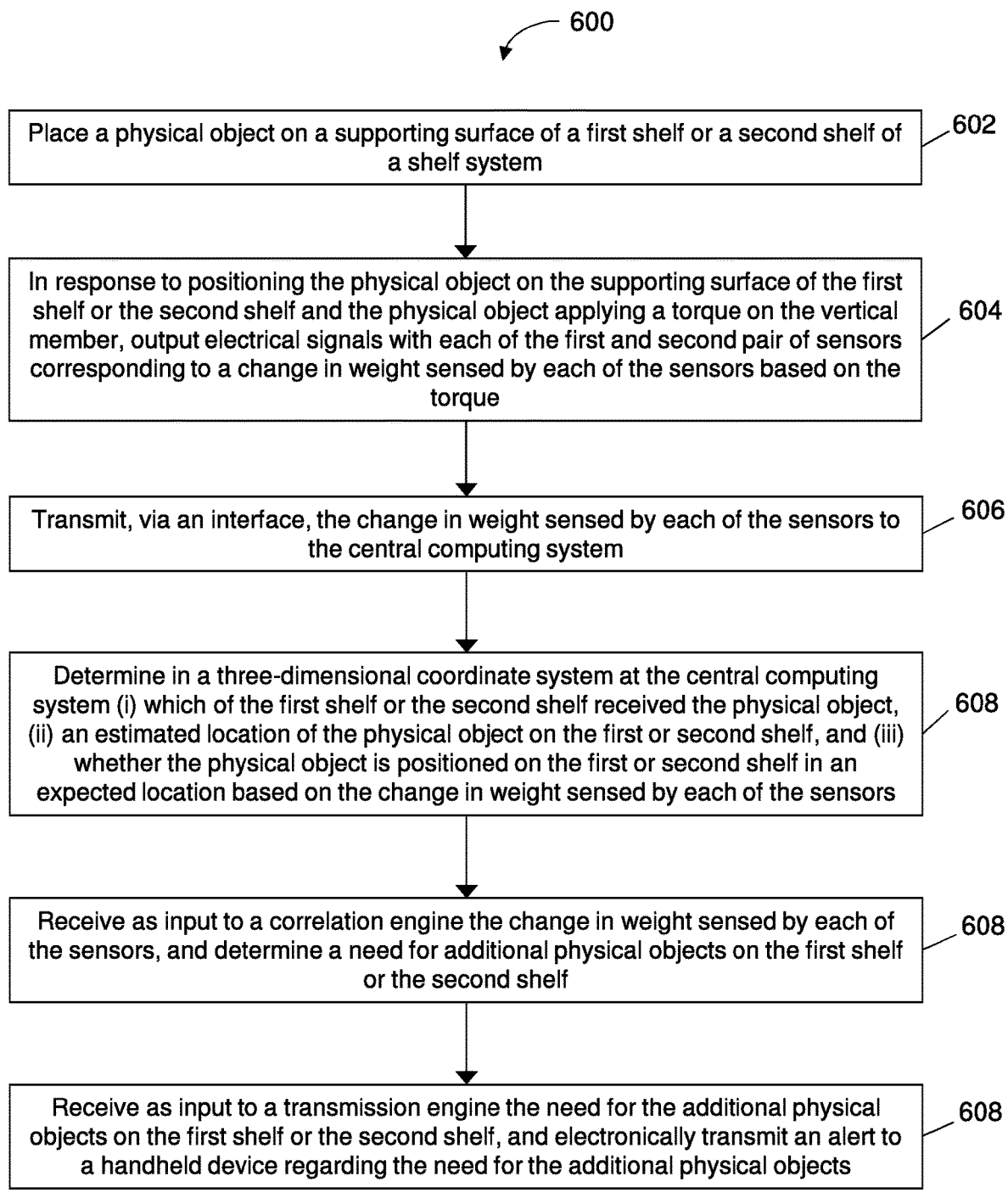
FIG. 9 is a flowchart illustrating an implementation of an exemplary shelf system in accordance with embodiments of the present disclosure.

FIG. 9 is a flowchart illustrating an exemplary process 600 as implemented by embodiments of the shelf system 100. To begin, at step 602, a physical object is placed on a supporting surface of a first shelf for second shelf of the shelf system, as described herein. At step 604, in response to positioning the physical object on the supporting surface of the first or second shelf and the physical object applying a torque on the vertical member, electrical signals can be output with each of the first and second pair of sensors corresponding to a change in weight sensed by each of the sensors based on the torque. At step 606, the change in weight sensed by each of the sensors can be transmitted via a communication interface to a central computing system.

At step 608, the central computing system can determine in a three-dimensional coordinate system which of the first or second shelf received the physical object, an estimated location of the physical object on the shelf, and whether the physical object is positioned on the first or second shelf in an expected location based on the change in weight sensed by each of the sensors. At step 610, a correlation engine can receive as the change in weight sensed by each of the sensors and determines a need for additional physical objects on the first or second shelf. At step 612, a transmission engine receives as input the need for additional physical objects on the first or second shelf, and electronically transmits an alert to a handheld device regarding the need for the additional physical objects.

Thus, the exemplary shelf system monitors the status of physical objects on each of the shelves of a shelf unit, and determines whether restocking of the physical objects is needed and/or whether the restocked physical objects have been placed on the proper shelf of the shelf unit. In particular, based on a change in weight distribution of the shelf unit as detected by a plurality of sensors disposed below the shelf, the automated shelf system detects the location of physical objects positioned on the shelf and determines if the physical object has been placed on the proper shelf and the proper location. Further, the shelf system issues an alert indicating a need for restocking of the physical object and/or movement of the physical object to another location in the shelf system.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A shelf system, comprising:
a frame including (i) a base member, and (ii) a vertical member mounted to the base member, the vertical member including a first vertically oriented side and a second vertically oriented side each configured and dimensioned to support one or more shelves, wherein the base member and the vertical member define an inverted T-shaped configuration;

a first shelf extending from the first vertically oriented side of the frame and a second shelf extending from the second vertically oriented side of the frame, the first and second shelves each including a supporting surface, a proximal end disposed adjacent to the respective first and second vertically oriented sides, and a distal end spaced from the respective first and second vertically oriented sides, a depth of the first and second shelves being defined by a distance between the proximal end and the distal end;

a first pair of sensors disposed below the base member in a spaced manner on one side of the vertical member of the frame and a second pair of sensors disposed below the base member in a spaced manner on an opposing side of the vertical member of the frame, wherein in response to positioning a physical object on the supporting surface of the first shelf or the second shelf, the physical object applies a torque on the vertical member and each of the sensors in the first and second pair of sensors output electrical signals corresponding to a change in weight sensed by each of the sensors based on the torque;

an interface operatively coupled to the first and second pair of sensors and configured to transmit the change in weight sensed by each of the sensors to a central computing system; and the central computing system configured to receive as input the change in weight sensed by each of the sensors and determine in a three-dimensional coordinate system (i) which of the first shelf or the second shelf received the physical object, (ii) an estimated location of the physical object on the first or second shelf, and (iii) whether the physical object is positioned on the first or second shelf in an expected location based on the change in weight sensed by each of the sensors.

2. The shelf system of claim 1, comprising a correlation engine that receives as input the change in weight sensed by each of the sensors, and determines a need for additional physical objects on the first shelf or the second shelf.

3. The shelf system of claim 2, comprising a transmission engine that receives as input the need for the additional physical objects on the first shelf or the second shelf, and electronically transmits an alert to a handheld device regarding the need for the additional physical objects.

4. The shelf system of claim 3, wherein the alert transmitted by the transmission engine indicates whether the additional physical objects are needed on the first shelf or the second shelf.

5. The shelf system of claim 3, wherein the alert to the handheld device includes information regarding a storage location of the physical object within a storage area of a geographic area and a display location within a display area of the geographic area.

6. The shelf system of claim 5, wherein the base member extends parallel to horizontal and includes a first front edge and a second front edge.

7. The shelf system of claim 6, wherein the first pair of sensors is disposed below the base member and is located at or near the first front edge.

8. The shelf system of claim 6, wherein the second pair of sensors is disposed below the base member and is located at or near the second front edge.

9. The shelf system of claim 1, wherein the frame includes a third shelf extending from the first vertically oriented side of the frame and disposed below the first shelf, and a fourth shelf extending from the second vertically oriented side of the frame and disposed below the second shelf.

10. The shelf system of claim 1, wherein each of the sensors is a force sensor.

11. The shelf system of claim 1, wherein each of the sensors is a pressure sensor.

12. A non-transitory computer-readable medium storing instructions for operating a shelf system that are executable by a processing device, the shelf system including (i) a frame including (a) a base member, and (b) a vertical member mounted to the base member, the vertical member including a first vertically oriented side and a second vertically oriented side each configured and dimensioned to support one or more shelves, wherein the base member and the vertical member define an inverted T-shaped configuration, (ii) a first shelf extending from the first vertically oriented side of the frame and a second shelf extending from the second vertically oriented side of the frame, the first and second shelves each including a supporting surface, a proximal end disposed adjacent to the respective first and second vertically oriented sides, and a distal end spaced from the respective first and second vertically oriented sides, a depth of the first and second shelves being defined by a distance between the proximal end and the distal end, (iii) a first pair of sensors disposed below the base member in a spaced manner on one side of the vertical member of the frame and a second pair of sensors disposed below the base member in a spaced manner on an opposing side of the vertical member of the frame, wherein in response to positioning a physical object on the supporting surface of the first shelf or the second shelf, the physical object applies a torque on the vertical member and each of the sensors in the first and second pair of sensors output electrical signals corresponding to a change in weight sensed by each of the sensors based on the torque, wherein execution of the instructions by the processing device causes the processing device to:
   transmit the change in weight sensed by each of the sensors from an interface operatively coupled to the first and second pair of sensors to a central computing system; and
   determine in a three-dimensional coordinate system at the central computing system (i) which of the first shelf or the second shelf received the physical object, (ii) an estimated location of the physical object on the first or second shelf, and (iii) whether the physical object is positioned on the first or second shelf in an expected location based on the change in weight sensed by each of the sensors.

13. The medium of claim 12, wherein execution of the instructions by the processing device causes the processing device to electronically transmit the change in weight sensed by each of the sensors to a correlation engine and determine, via the correlation engine, a need for additional physical objects on the first shelf or the second shelf.

14. The medium of claim 13, wherein execution of the instructions by the processing device causes the processing device to electronically transmit the need for the additional physical objects on the first shelf or the second shelf to a transmission engine and electronically transmit, via the transmission engine, an alert to a handheld device regarding the need for the additional physical objects.

15. The medium of claim 14, wherein the alert transmitted by the transmission engine indicates whether the additional physical objects are needed on the first shelf or the second shelf.

16. A method of operating a shelf system, comprising:
   placing a physical object on a supporting surface of a first shelf or a second shelf of a shelf system, the shelf system including:
      (i) a frame including (a) a base member, and (b) a vertical member mounted to the base member, the vertical member including a first vertically oriented side and a second vertically oriented side each configured and dimensioned to support one or more shelves, wherein the base member and the vertical member define an inverted T-shaped configuration,
      (ii) the first shelf extending from the first vertically oriented side of the frame and the second shelf extending from the second vertically oriented side of the frame, the first and second shelves each including the supporting surface, a proximal end disposed adjacent to the respective first and second vertically oriented sides, and a distal end spaced from the respective first and second vertically oriented sides, a depth of the first and second shelves being defined by a distance between the proximal end and the distal end;
      (iii) a first pair of sensors disposed below the base member in a spaced manner on one side of the vertical member of the frame and a second pair of sensors disposed below the base member in a spaced manner on an opposing side of the vertical member of the frame,
      (iv) an interface operatively coupled to the first and second pair of sensors, and
      (v) a central computing system;
   in response to positioning the physical object on the supporting surface of the first shelf or the second shelf and the physical object applying a torque on the vertical member, outputting electrical signals with each of the first and second pair of sensors corresponding to a change in weight sensed by each of the sensors based on the torque;
   transmitting, via the interface, the change in weight sensed by each of the sensors to the central computing system; and
   determining in a three-dimensional coordinate system at the central computing system (i) which of the first shelf or the second shelf received the physical object, (ii) an estimated location of the physical object on the first or second shelf, and (iii) whether the physical object is positioned on the first or second shelf in an expected location based on the change in weight sensed by each of the sensors.

17. The method of claim 16, comprising receiving as input to a correlation engine the change in weight sensed by each of the sensors, and determining a need for additional physical objects on the first shelf or the second shelf.

18. The method of claim 17, comprising receiving as input to a transmission engine the need for the additional physical objects on the first shelf or the second shelf, and electronically transmitting an alert to a handheld device regarding the need for the additional physical objects.

19. The method of claim 18, wherein the alert transmitted by the transmission engine indicates whether the additional physical objects are needed on the first shelf or the second shelf.

20. The method of claim 19, wherein the alert to the handheld device includes information regarding a storage location of the physical object within a storage area of a geographic area and a display location within a display area of the geographic area.

* * * * *